(12) United States Patent
Kelly et al.

(10) Patent No.: US 7,991,891 B2
(45) Date of Patent: Aug. 2, 2011

(54) VERSION-SPECIFIC CONTENT SEARCHING

(75) Inventors: Michael J. Kelly, Bainbridge Island, WA (US); Matthew C. Gauthier, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1016 days.

(21) Appl. No.: 11/346,094

(22) Filed: Feb. 2, 2006

(65) Prior Publication Data

US 2007/0180051 A1 Aug. 2, 2007

(51) Int. Cl.
*G06F 15/173* (2006.01)
(52) U.S. Cl. ............... 709/226; 709/220; 707/999.003; 707/999.104
(58) Field of Classification Search .............. 709/220, 709/226; 707/999.003, 999.104
See application file for complete search history.

(56) References Cited

U.S. PATENT DOCUMENTS

| | | | |
|---|---|---|---|
| 6,185,567 B1 | 2/2001 | Ratnaraj et al. | |
| 6,510,439 B1 | 1/2003 | Rangarajan et al. | |
| 6,546,385 B1 | 4/2003 | Mao et al. | |
| 6,687,712 B2 * | 2/2004 | Mito et al. | 707/104.1 |
| 6,801,906 B1 | 10/2004 | Bates et al. | |
| 7,146,535 B2 * | 12/2006 | Little et al. | 714/26 |
| 7,480,703 B2 * | 1/2009 | Shapiro | 709/220 |
| 7,496,560 B2 * | 2/2009 | Manber et al. | 707/3 |
| 2003/0093507 A1 | 5/2003 | Shapiro | |
| 2003/0158839 A1 | 8/2003 | Faybishenko et al. | |
| 2005/0256955 A1 | 11/2005 | Bodwell et al. | |

OTHER PUBLICATIONS

International Search Report regarding Application No. PCT/US2007/002669 dated Jul. 20, 2007.
Extended European Search Report regarding EP Application No. 07763187.7 dated Dec. 11, 2009, 9 pages.
European Patent Office Communication regarding EP Application No. 07763187.7 dated Feb. 19, 2010, 7 pages.
Office Action from the Patent Office of the State Intellectual Property Office of the People's Republic of China regarding Application No. 200780004502.X dated Feb. 12, 2010.

* cited by examiner

*Primary Examiner* — Yves Dalencourt (57) ABSTRACT

Content returned by a search query is specific to a version of a product installed on or associated with the computer system requesting the search. Upon receipt of the search query, a search system accesses a persistent descriptor corresponding to a detected version of the product. The persistent descriptor may be a cookie file stored on the requesting computer system. A product detection module interrogates the computer system to identify the associated products, including the particular versions of those products. The search of a repository of general content related to the product is scoped using the persistent descriptor as a search filter in order to provide version-specific content.

20 Claims, 7 Drawing Sheets

VERSION-SPECIFIC CONTENT SEARCHING

BACKGROUND

Many organizations make multiple versions of software or other products. For example, Microsoft provides multiple versions of its core operating system software, e.g., Windows XP, Windows NT, and Windows 2000, and multiple versions of its office productivity software, e.g., Office XP, Office 2000, Office 2003, and Office X. In another example, an automobile manufacturer generally creates a new base version of an automobile model annually with multiple versions of each model within the same year. For example, General Motors may produce generally the same pickup truck for both Chevrolet (Silverado) and GMC (Sierra), but each will have slightly different features. Further, each brand truck may have several versions based upon, for example, engine size (1500, 2500, 3500, hybrid), drive train (two or four wheel drive), suspension, passenger compartment (regular, extended cab, crew cab), and feature package (WT, LT, LS, SS). Many of these organizations publish rich and deep assistance content for these products, for example, product demonstrations, product training, support tips, and articles. Often this content is published for accessibility over a public network, for example, on the World Wide Web accessed via the Internet. Unfortunately, although technically accessible, it is often difficult for a user to find subject matter directly related to their particular needs. In part, this problem is a result of different information and content applying to different versions of a product. This problem is exacerbated by the fact that most users do not know which version of a particular product they are actually using in order to select the most appropriate information to address their need.

The information included in this Background section of the specification is included for technical reference purposes only and is not to be regarded subject matter by which the scope of the invention is to be bound.

SUMMARY

The technology described and claimed herein may be viewed as an exemplary implementation of a method for providing content in response to a search query regarding a software product. The content returned by the search is specific to a version of the software product installed on the computer system of the user conducting the search. A typical search is conducted over the Internet wherein a user of the software product transmits a search request for content related to a software product to a web server. Upon receipt of the search query, the web server accesses a persistent descriptor corresponding to a detected version of the software product. The persistent descriptor may be a cookie file stored on the user's computer system, information stored in a persistent store on the web server itself (e.g., indexed by some unique identifier assigned to the user), or both.

The cookie file may be created by a software detection module transmitted to the user's computer by the web server as an initial response to the search request. The software detection module interrogates the user's computer system to identify the software products installed, including the particular versions of those products. The search of a repository of general content related to the software product is scoped using the persistent descriptor (e.g., cookie file) as a search filter in order to provide version-specific content in response to the search query relevant to the detected version of the software product.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computer system and encoding the computer program. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

DETAILED DESCRIPTIONS

In a general implementation of the technology described herein, content returned by a search query is specific to the version of a product installed on or associated with a computer system requesting the search. Upon receipt of a search query, a search system, for example, a web server, accesses a persistent descriptor corresponding to a detected version of the product. The persistent descriptor may be a cookie file stored on the requesting computer system, a file stored in a database or other repository on the server and indexed by some unique user or machine identifier, or both. A product detection module interrogates the computer system to identify the associated or installed products, including the particular versions of those products. The search of a repository of general content related to the product is scoped using the persistent descriptor as a search filter in order to provide version-specific content.

Figure 1:
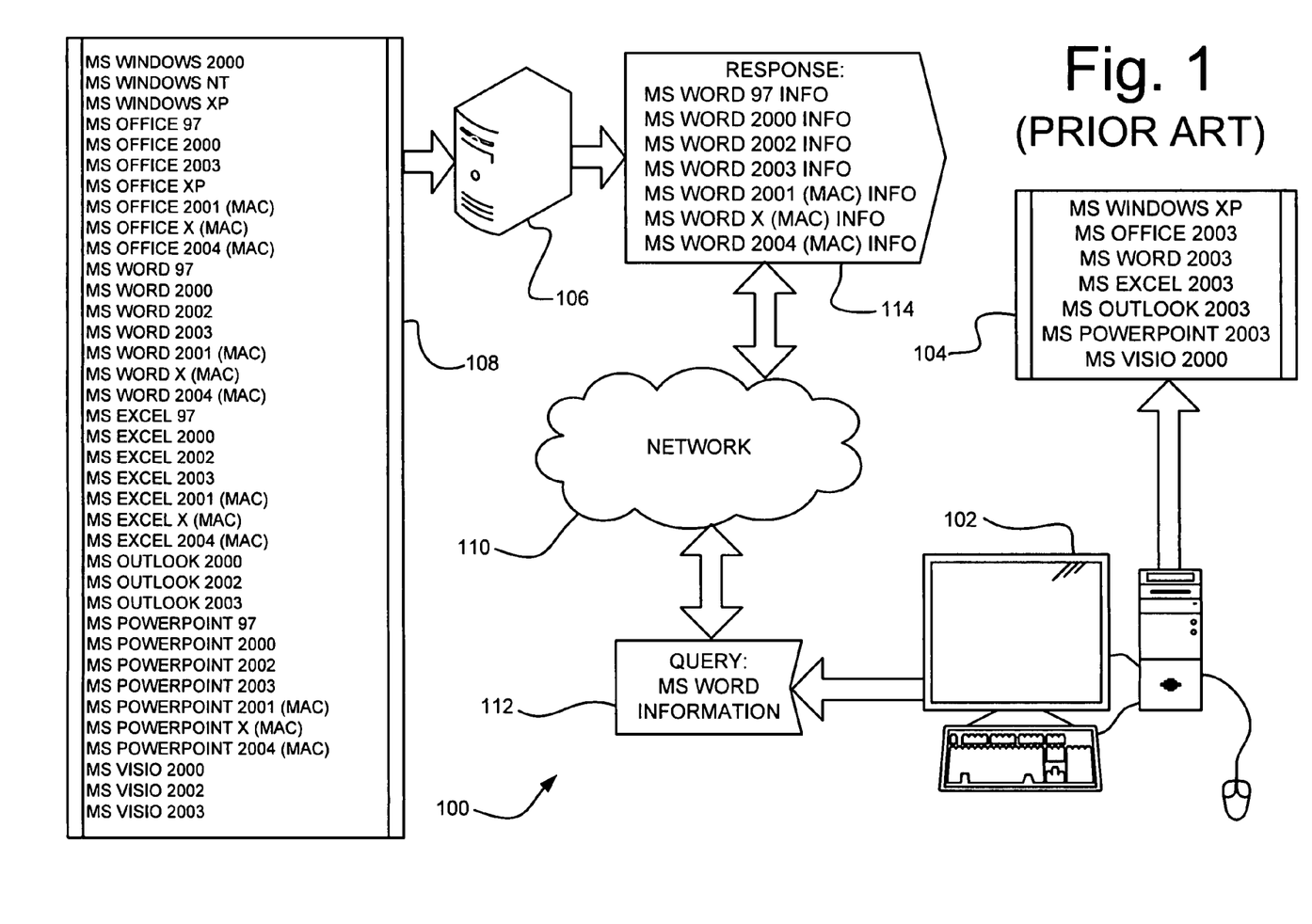
FIG. 1 is a schematic depiction of a typical prior art result of a search for information related to a product.

FIG. 1 depicts a typical prior art search scheme over a networked system 100 in which a user attempts to access information and content with respect to a product that has multiple versions. In the exemplary illustration of FIG. 1, user's computer system 102 may be loaded with an operating system and a variety of software products. An exemplary product listing 104 may include MS Windows XP as the operating system for the computer system 102. Particular productivity software products may include MS Office 2003, which comprises several independent programs including MS Word 2003, MS Excel 2003, MS Outlook 2003, and MS PowerPoint. In addition, the computer system 102 may have other programs, for example, MS Visio 2000.

Often a user of the computer system 102 is interested in finding information related to a particular software program. For example, the user may want to learn how to automatically number paragraphs in MS Word or create a graph using data entered into a MS Excel spreadsheet. Often product producers create significant amounts of supporting information and content on such features of a software product. However, it is often impractical to provide this product information with the product software in either electronic or print form for several reasons. First, printing such voluminous information on paper is extremely costly. Second, even if provided in electronic form on the user's computer system, the memory requirements to store such a large amount of information are excessive. Third, if provided in either print or electronic form at the time of software purchase, the information is static and there is no simple, inexpensive way to provide changes, updates, corrections, or other additional information. Thus, product information is often made available for access by users via the Internet or other communication network 110.

In the example of FIG. 1, a computer file server or web server 106 maintains a large repository 108 of information related to a variety of products. In some instances, information may be relevant only to a particular version of a product. In other instances, information may be relevant to multiple versions of a product. For example, as depicted in FIG. 1, the repository 108 stores information related to three versions of MS Windows, seven versions of MS Office, seven versions of MS Word, seven versions of MS Excel, three versions of MS Outlook, seven versions of MS PowerPoint, and three versions of MS Visio.

When a user of the computer system 102 submits a query 112 via the network 110 to the web server 106 seeking information about a specific issue, the web server 106 accesses the repository 108 for responsive information. However, the information returned by the web server 106 in a response 114 may not be particularly relevant to the configuration of the computer system 102 of the user. For example, as depicted in FIG. 1, the query 112 submitted by the computer system 102 may request information related to an MS Word product. The computer system 102 is running MS Word 2003, but the web server 106 has no information regarding the version of MS Word used on the computer system 102. Therefore, the response 114 to the query 112 returned by the web server 106 may contain information relevant to MS Word 97, MS Word 2000, MS Word 2002, MS Word 2003, MS Word 2002 (Macintosh), MS Word X (Macintosh), and MS Word 2004 (Macintosh).

Some of the information may be the same between different versions of the MS Word products, but some of the information may be different due to improvements or new features included in later versions or versions made for different operating systems. Unless the user knows what version of MS Word is running on the computer system 102, and potentially what operating system is running on the computer system 102, the user will not know which of the information returned in the response 114 to the query 112 is actually relevant to the user's need. In addition, a particular result may be only partially, but not fully relevant, depending upon the specific product version correlated with the result. Thus, the user is forced to sift through the information returned in the response 114 to determine which results and which information in particular results may be relevant to the need expressed in the query 112.

Figure 2:
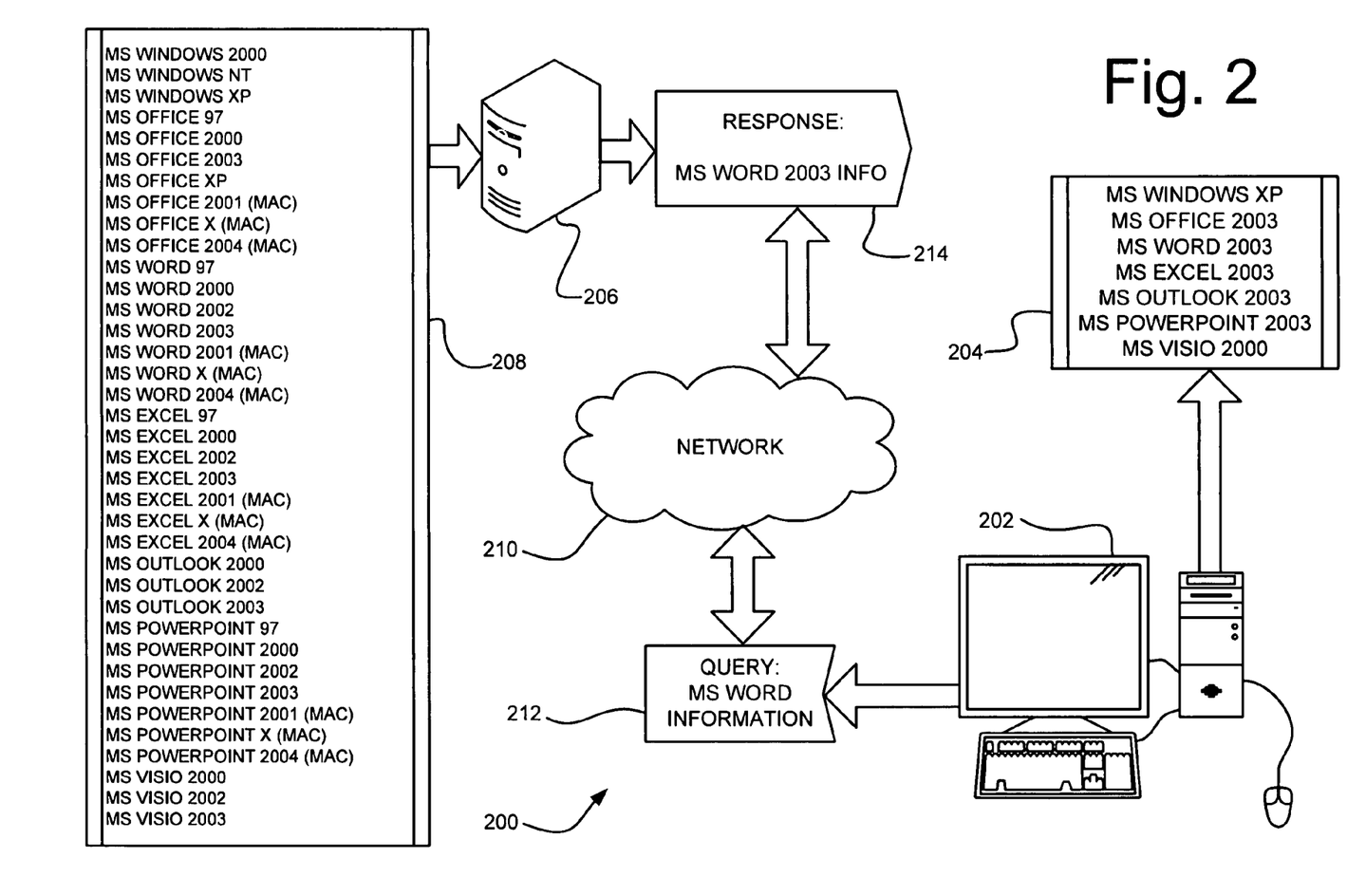
FIG. 2 is a schematic depiction of a result of a search for information related to a product according to processes described herein.

FIG. 2 depicts a similar networked system 200 to that depicted in FIG. 1. Again, a user of a computer system 202 is interested in finding information related to a particular software program. The computer system 202 may be loaded with an operating system and a variety of software products. An exemplary product listing 204 may again include MS Windows XP as the operating system for the computer system 202. Particular productivity software products may include MS Office 2003, which comprises several independent programs including MS Word 2003, MS Excel 2003, MS Outlook 2003, and MS PowerPoint. In addition, the computer system 202 may have other programs, for example, MS Visio 2000.

A computer file server or web server 206 again maintains large repository 208 of information related to a variety of products. As before, the information may be relevant only to a particular version of a product or the information may be relevant to multiple versions of a product. For example, the repository 208 stores information related to three versions of MS Windows, seven versions of MS Office, seven versions of MS Word, seven versions of MS Excel, three versions of MS Outlook, seven versions of MS PowerPoint, and three versions of MS Visio.

As shown in FIG. 2, when a user of the computer system 202 submits a query 212 via the network 210 to the web server 206 seeking information about a specific issue, the web server 206 accesses the repository 208 for responsive information. In this instance, however, the web server 206 is provided information from the user's computer system 202 identifying the operating system version and software product types and versions resident on the computer system 202. Thus, the information returned by the web server 206 in a response 214 is now particularly relevant to the configuration of the computer system 202 of the user.

For example, as depicted in FIG. 2, the query 212 submitted by the computer system 202 may request information related to an MS Word product. As before, the query 212 merely requests information related to an MS Word issue. The query 212 as authored by the user contains no further information about the version of MS Word or operating system running on the computer system 202. In this instance, the computer system 202 is running MS Word 2003. However, version information encoded in a persistent descriptor, i.e., a cookie, written on the user computer system 202 and which may also contain additional state information about the computer system 202, is also transmitted to the web server 206.

The version information may be sent to web server 206 as part of a hypertext transfer protocol (HTTP) request that transmits the query information. This follows a general rule of HTTP protocol that cookies related to a particular web site are automatically included in all HTTP requests sent by the user computer 202 to the web server 206 for that web site.

Once the version information in the cookie is received at the web server 206, the version information may also be stored in stored in a central user information database on the web server 206. Central storage of the version information may be desirable in case the cookie is deleted on the user computer system or the user is using a public computer (as opposed to the user's own computer system) to request a search. By storing the version information server-side in a password protected user store, the user can login on the web server and authorize access to the version information. Thus, if a version detection cookie is not present, the search requests can incorporate version information from the persistent descriptor in the user store on the web server.

When a user logs in to the web server, a "session cookie" is created which contains a unique user identifier. The user identifier may be used to index the repository to determine whether version information exists for the user, even if it is not transmitted in the version detection cookie. The search protocol would rely on the version cookie in the HTTP request first, but if not present and a session cookie is present, meaning the user had successfully logged in during the session, the search would use the session cookie to index the user store and access the version information there. Alternatively, a user or machine identifier may be transmitted by the computer system 202 to the web server 206 along with the query 212 and this unique identifying information may be used by the web server 206 to look up information on the configuration of the user's computer system 202.

Because the web server 206 now additionally receives information regarding the version of MS Word used on the computer system 202, the response is tailored to provide a response 214 limited to information related to MS Word 2003, or to otherwise sort results in the response 214 to place MS Word 2003 information first among the results. Methodologies for achieving this improved search response 214 are further described herein with respect to the remaining figures.

While FIG. 2 and other figures herein depict the information query transaction occurring between a user computer and a remote computer system, exemplified herein as a web server, the remote computer may be any other computer system. Further, the information query need not be transacted over a network and could merely be a query within a help file stored on the user's computer system. For example, suppose there was a version of Word called "Professional" which included features that were not in a version called "Essentials." It may be the identical program for both versions installed on a user computer, but the use of a license key determines which features are made available to the user depending upon which product was purchased. In this case, the help files associated with the program and installed on the user computer may include information on all features, which provides a superset of information for Professional version users. By using version information, a local search on the help files in this case may be used to scope the search to return only a subset of results pertinent to the Essentials version if the user only had an Essentials license.

Figure 3:
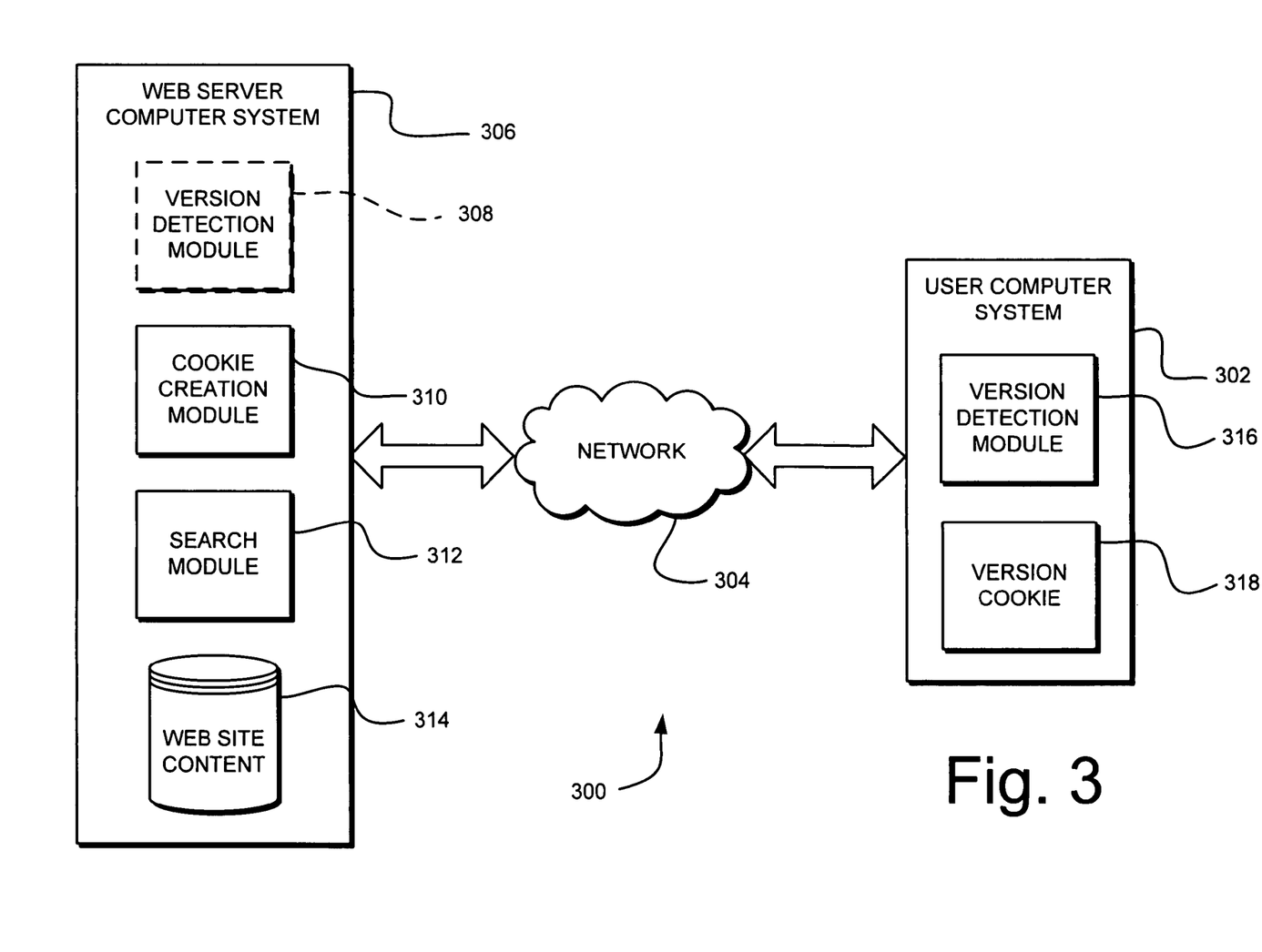
FIG. 3 is a schematic depiction of a networked system for detecting versions of products on a user system.

FIG. 3 depicts another conceptualization of a networked system 300 for producing product version specific content. A user computer system 302 is connected via a network 304 to a web server computer system 306. The web server 306 may comprise a variety of components including a version detection module 308, a cookie creation module 310, a search module 312, and a content database 314. The version detection module 308 may be a software program, for example, a Java applet or ActiveX control, which is stored on the web server 306 for transmission to the user computer system 302 over the network 304. When a copy of the version detection module 308 is transmitted to the user computer system 302 over the network 304, the copy of version detection module 316 is stored on the user computer system 302.

The version detection module 308 is designed to interrogate the user computer system 302 to determine which versions of products are associated with the user computer system 302. As in the example of FIG. 2, the version detection module 316 may detect the operating system version of the user computer system 302 or the versions of various software products installed on the user computer system 302. In another example, the computer system 302 may itself be a component of a product, for example, an automobile. The computer system 302 may be connected to the web server 304 via a wireless network, for example, the General Motors OnStar® network. In this example, the version information collected by the version detection module 316 may relate to the model of the automobile, the production year, and any particular version of the automobile (e.g., engine size, trim package, suspension package, safety package, brake package, etc.). Detection of additional products and versions is contemplated herein.

Once the version information is collected, the version detection module 316 transmits the version information across the network 304 to the web server computer system 306. The cookie creation module 310 at the web server 306 uses the version information to create a persistent descriptor of the product version, for example, a cookie file, usable by the search module 312 in scoping search results for relevance to product versions associated with the particular user computer system 302. The web server 306 transmits the cookie file over the network 304 to the user computer system 302 where it is stored as a version cookie 318 for use when future searches are performed by the user computer system 302 at the web server computer system 306.

When a search is later requested by the user computer system 302, the search module 312 accesses the version cookie 318 from the user computer system 302. The search module uses the version information on the version cookie 318 to scope a search of the web site content 314 to prioritize or limit the search results to content information most relevant to the product versions on the user computer system 302.

Figure 4:
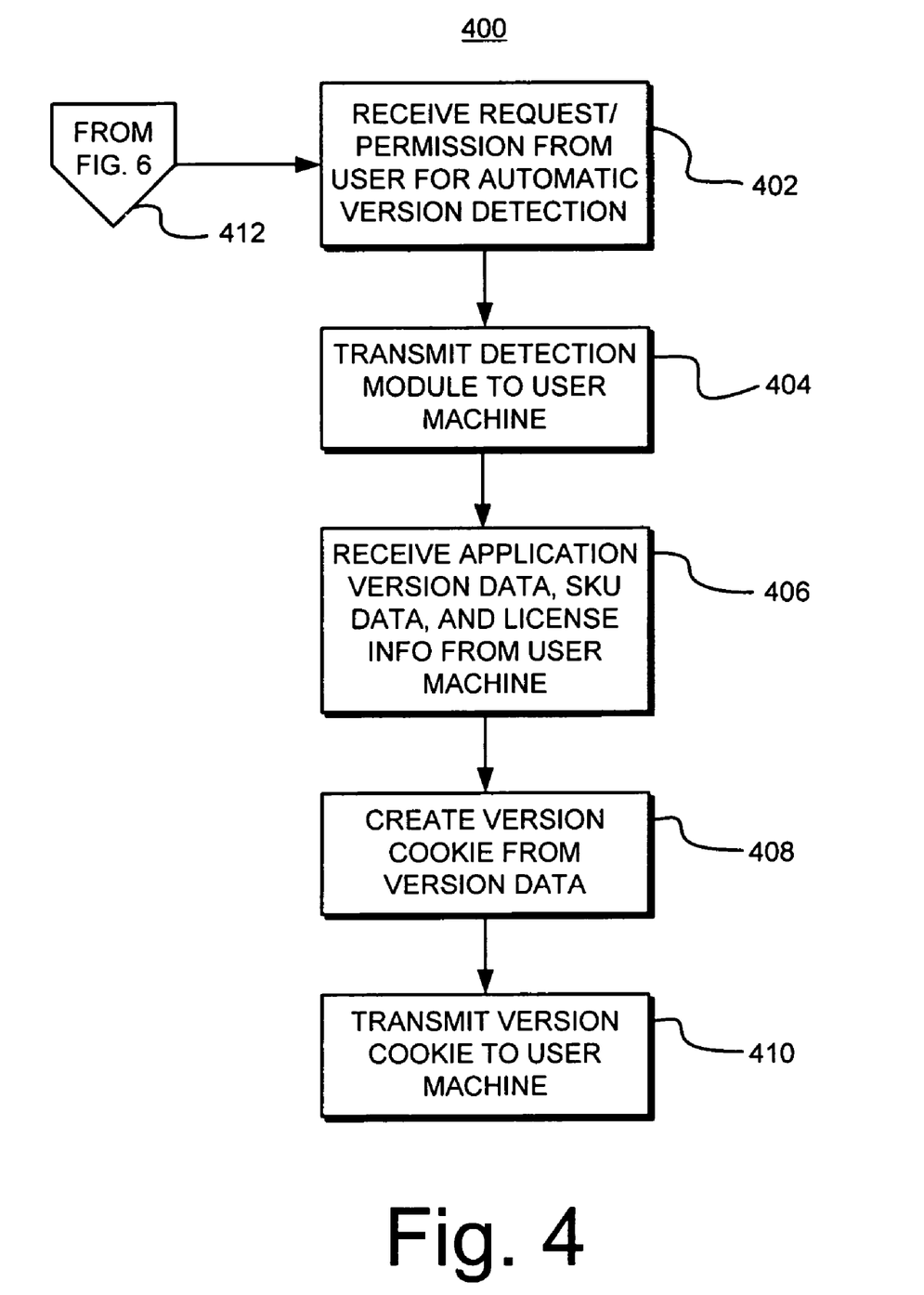
FIG. 4 is a flow diagram of operations performed by a web server computer to create and place a product version cookie on a user computer.

An exemplary process 400 for developing a version cookie at a web server is depicted in FIG. 4. The process 400 is initiated by a first receiving operation 402, wherein the web server receives a request from a user computer system for automatic detection of product versions associated with the user computer system. The request may also include a grant of permission from the user computer system for the collection and transmission of version information from the user computer system to the web server. Permission or authorization may be required for the collection and transmission of the version information from the user computer system due to privacy legislation or regulations because the version information may be classified as personally identifiable information or meet certain definitions of personal or private information requiring the authorization of the user for collection.

In order to obtain such authorization, the user interface (UI) initially generated by the web server may include a registration section that must be completed before any version information is collected. Further, once a persistent descriptor file has been created, the UI may indicate the fact that the search was scoped according to particular version parameters specific to the user's computer system. The UI may also provide an option for the user to select additional versions to include in the search scope even though such versions were not detected on the user's computer.

A first transmission operation 404 follows the first receiving operation 402, wherein upon receipt of the request for version detection and any necessary authorization, the version detection module is transmitted by the web server over the network to the user computer system. As discussed above, once received and stored on the user computer system, the version detection module interrogates the user computer system to identify the products and particular versions thereof installed on or associated with the user computer system and transmits the product version information to the web server. In a second receiving operation 406, the web server receives the version data from the user computer system. In an implementation in which the product information relates to software installed on the user computer system, the information received may include product version data, the stock keeping unit (SKU) number for the product version, and product license information (e.g., licensed for personal, business, or educational use).

A creation operation 408 follows the second receiving operation 406 in which the version information is used to create a version cookie for storage on the user computer system. The version cookie contains a unique identifier for the user computer and a string of information about products detected or selected.

While the version cookie may be created at the user computer, for example, with JavaScript, there are several reasons for creating the cookie at the web server. First, it may be desirable to store the version information in a database at the web server, not only in a cookie. In order to store the information at the web server, the version information needs to be available on the server anyway. Second, in addition to automatically detecting the version information, the user may be allowed to edit the detected information. For example, a user may not have Visio 2003 installed on the user computer and thus the detection module will not identify that program in the version information, but the user may still be interested in receiving information related to that program in response to queries. An interface for editing the version information may thus be provided by the web server before the version cookie is created in order to include additional product selections beyond those products detected.

A second transmission operation 410 then transmits the version cookie over the network to the user computer system for storage in memory at the user computer system and access during future searches for product content to appropriately scope the search. Note that the process 400 for developing a version cookie may be initiated at step 412 as a result of the process 600 of FIG. 6 further described herein below.

In another implementation, the version detection module may create the version cookie on the user computer system without first sending the product and version information to the web server for creation of the version cookie there. However, it may be desirable to follow the steps of FIG. 4 and create the version cookie at the web server to ensure that the version cookie to facilitate storage of version information at the web server as well as at the user computer system.

In addition to automatic version detection, the version detection module may provide an opportunity for the user to manually define the product and version information to be used in a search. This may be desirable when a user is either seeking information unrelated to products installed on or associated with the computer the user is presently using. For example, the user may be using a public computer to perform a search rather than the user's personal computer. Manual version definition may also be used to expand the search scope at the outset if the user knows he wants information about two separate product versions. This may be desirable, for example, in a situation where the user wants to compare the features of two product versions.

Figure 5:
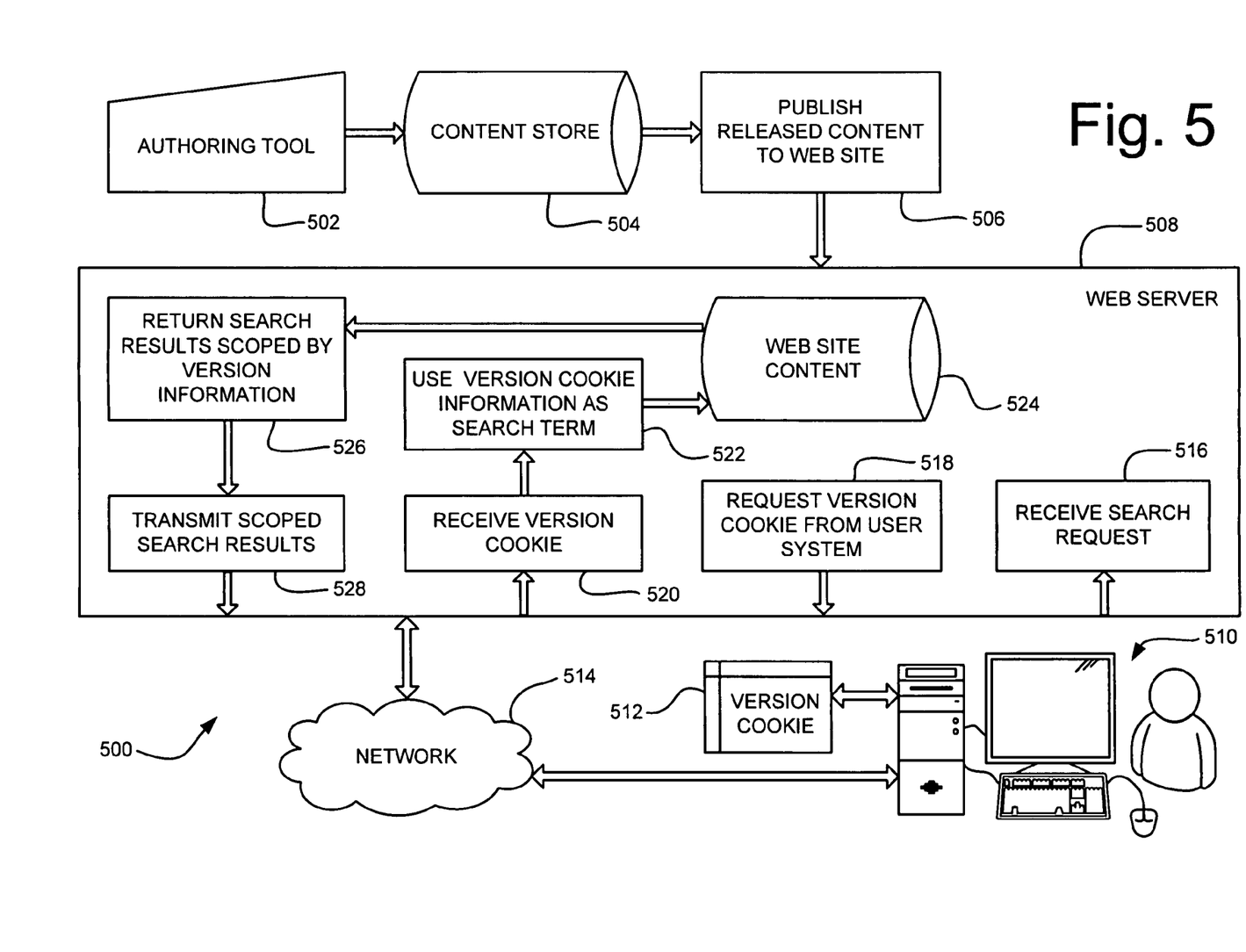
FIG. 5 is a schematic depiction of a networked system for returning search results to a user scoped to a particular product used by the user.

FIG. 5 depicts a further implementation of a system 500 for providing content search results scoped to a particular product version running on a user's computer system 510. Product-relevant content is posted on a web server 508 for access by a user via a web site interface. An authoring tool 502 may be used to create content identified with specific product versions. While in development, the content authored by the authoring tool 502 may be saved in a content store 504, e.g., a database used as a staging area for content under development before the content is posted to the web server 508.

The authoring tool 502 may provide content authors an ability to classify or "tag" content as applicable or relevant to one or more product versions. Thus, when a search is performed on a large volume of general content that may or may not be related to the product that is the subject of the search query, version-specific content relevant to the product can easily be identified. In one exemplary implementation, the authoring tool 502 may be used to code data-type definitions in extensible mark-up language (XML) files that are associated with particular pieces of content. The XML files function as tags to identify the subject matter of a particular content entry, including the particular product and version to which the content relates.

In an exemplary implementation involving computer software products, multiple versions of a particular software product may be installed on multiple user computers, respectively. For example, a first user may have MS Word 2000 installed on his computer, while a second user has MS Word 2003 installed on her computer, and a third user has MS Word X for Macintosh installed on his computer. Each of these versions of MS Word have common features and functions, however, each version also has differences from the other versions. Differences may include, for example, improvements over older versions, new features not present in older versions, or differences dictated by peculiarities of different operating systems.

In the context of this implementation, a goal is to provide content specific to each version of MS Word for access by users. This content may be in the form of for example, user guide or manual information, other help or how to information, tutorials, demonstrations, and discussion threads. Noting that a significant amount of information content is applicable to each version of MS Word, it does not make sense from a resource standpoint to author entirely separate content for each version of MS Word. Thus, the authoring tool 502 may be used to tag discrete pieces of content to identify the applicability of a piece of content to one or more versions of MS Word. Thus, a piece of content applicable to each of MS Word 2000, MS Word 2003, and MS Word X may have three tags, whereas a piece of content applicable to only MS Word 2000 would have only one associated tag.

It may further be beneficial from a resource standpoint to further break up content for a particular topic into a general content piece applicable to multiple versions and specific content pieces that are applicable to only particular versions. A search related to a particular software product version could then pull together the general content piece and the applicable specific content pieces to create a complete, version-specific, discussion on the topic.

Once the content is created and appropriately tagged, it is released and published 506 to the web server 508. The content is stored in a web site content database 524 on the web server 508 for searching in response to user queries. For example, the user's computer system 510 may submit a search request over the network 514, which is transmitted to the web server 516. In a reception operation 516, the web server 508 receives the search request from the network 514 and responds with a request operation 518 to request a version cookie 512 from the user's computer system 510. The version cookie request is transmitted over the network 514 to the user's computer system 510. A version cookie 512 stored in memory on the user's computer system 510 is then transmitted back to the web server 508 via the network 514.

In a second reception operation 520, the version cookie 512 is received at the web server 508 and in a search operation 522 the version cookie information is incorporated into the search query as one or more search terms. A software search module stored on the web server 524 interrogates the general content stored in the web site content database 524. In a search return operation 526, version-specific content is collected as a result of scoping the search to identify only, or at least hierarchically, content tagged as relevant to the particular product version identified in the version cookie 512. In a transmission operation 528, the version-specific search results are then transmitted via the network 514 to the user computer system 510 for display or other output.

A breadcrumb may be presented as the user moves through the search results to help the user see the scope of information returned. A breadcrumb is a textual representation of where and how information is located within the "information architecture" or hierarchy of a web site or data structure. Breadcrumbs generally display how major categories of information are linked along a continuum of sequential order. Often a breadcrumb may be displayed as a navigational path of linked pages (e.g., a uniform resource locator for a page) that the user has moved through in order to reach the present page. Alternatively or additionally, a textual identification of the version information corresponding to the content returned may be presented to the user in conjunction to the content to reinforce to the user that the content returned is version-specific.

In addition to user guide tutorial information and other help or how to information traditionally considered product-related content, content susceptible to version searching may also include product training and demonstrations, articles, demonstrations, and discussion threads related to the product. Further, a version-specific search may also return applicable marketing or advertising content. For example, if the version cookie 512 indicates the user computer system has MS Office 2003 installed, an appropriate advertising message may suggest upgrading to MS Office "12" upon the release of that new product version and provide a link to a commerce interface to complete a purchase transaction.

Figure 6:
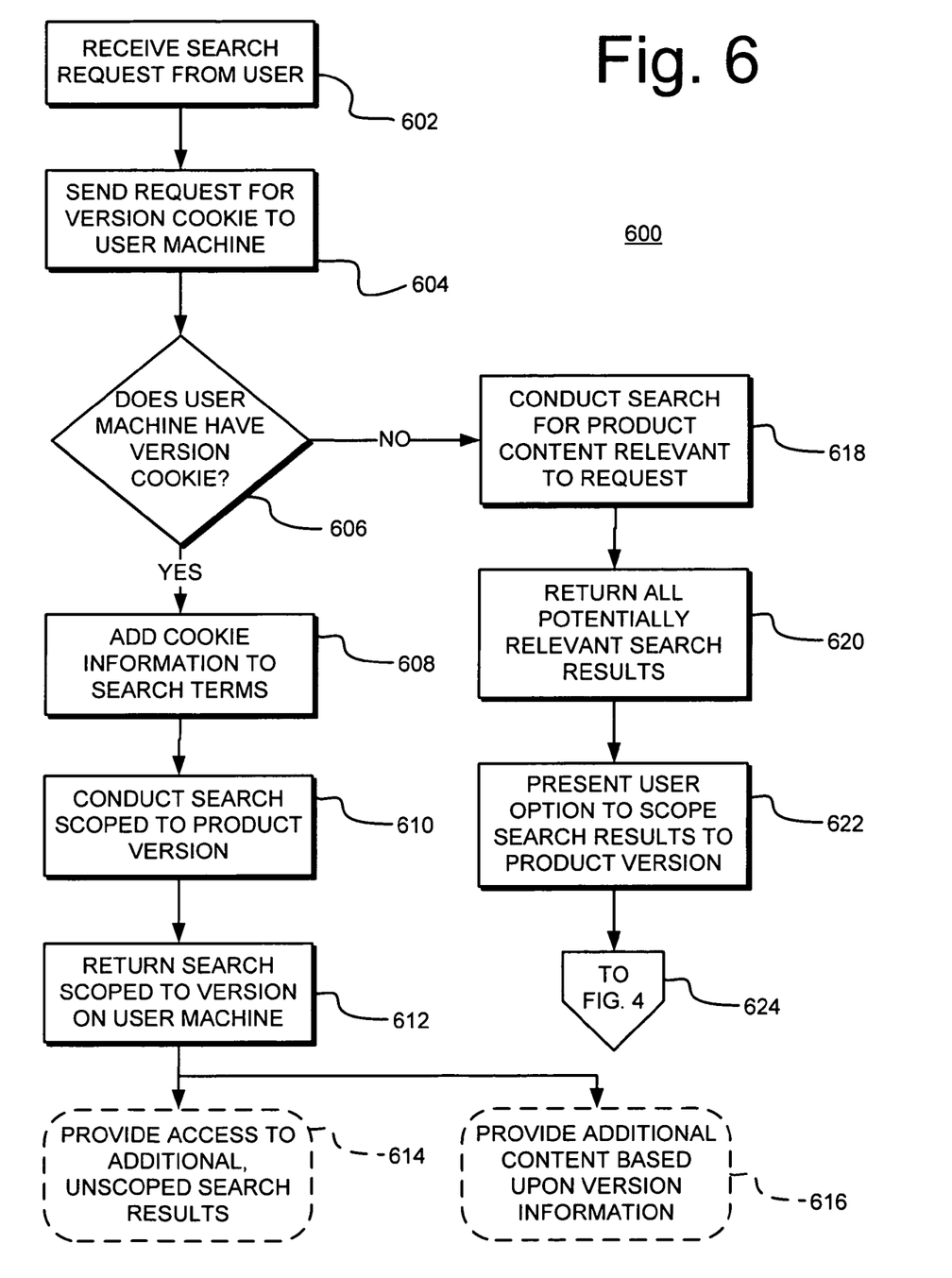
FIG. 6 is a flow diagram of operations performed by a web server computer for returning search results to a user scoped to a particular product used by the user.

FIG. 6 depicts an exemplary process 600 for performing a search through a repository of general content for content specifically related to a product wherein the search results are scoped for relevance to a particular version of the product. In one implementation, the search may be performed by a web server receiving a search request over a network, for example, the Internet. In a receiving operation 602, a search request is received at the web server from a user system. The search requests content relevant to a particular product. The web server in a sending operation 604 transmits a request for a version cookie over the network to the user system.

Upon receipt of a return transmission from the user system, the web server performs a query operation 606 and determines whether the user system has a version cookie. Confirmation of the presence of a version cookie may be confirmed simply by receipt of the version cookie information from the user system. If a version cookie is returned, the web server performs an adding operation 608 and includes the version cookie information as a search term before searching the general content for product-specific content. A search operation 610 uses the revised search query to seek version-specific content for the product that is most relevant to the user system. A return operation 612 then returns search results appropriately scoped to the version of the product incorporated with the user system.

In another implementation, version-specific information may be returned to a user in the event the user is not presently using a computer system with a version cookie. This is enabled by the parallel storage of version information at the web server when the version cookie was created and stored on the user's computer system. For example, a user may visit a web site providing product information from a public computer. If the user is able to register at the web site via some authentication system, the version information stored on the web server database and associated with the user may be accessed to scope a search performed by the user on the public computer. Thus, if the user is on a computer system that is not his own, the system can still return information correct correctly scoped to versions associated with the user based on the version information stored at the web server.

In addition to returning the version-specific search results as indicated in the return operation 612, the process 600 may include one or more optional operations for providing additional content of potential interest to the user. A first optional operation 614 may provide the user access to additional search results that are product related, but not version specific. Such search results could be provided as, for example, additional search result listings placed hierarchically underneath the version-specific content. Alternatively, such search results could be made available to a user by presenting a link to a second display of the additional, non-version-specific content.

A second optional operation 616 may provide the user with additional content based upon the version information, but not specific to the product or version of the product that was the subject of the user's search. For example, suppose product A, version 1 is incorporated with the user system and the user sends a search request related to product A. Further suppose an upgrade to product A in the form of version 2 is available. While the search results are scoped to version 1, the search results could include additional content indicating that version 2 is available, providing information about version 2, and offering the user an opportunity to purchase version 2. Alternatively, the search results could provide additional information related to product B as a complement to product A.

Returning to the query operation 606, in the event that the user system does not have a version cookie, the web server may perform a search operation 618 relevant to the subject product of the search request, but not scoped to an particular version of the product. The process 600 would then return all potentially relevant search results regardless of product version in a return operation 620. Although the content returned in the search is not scoped to a specific product version, the process 600 may include a presentation operation 622 in which the user is presented an option to scope the search results to the product version associated with the user system. If the user selects this option, the process 600 executes a transfer operation 624 to initiate the cookie creation process 400 depicted in FIG. 4.

Figure 7:
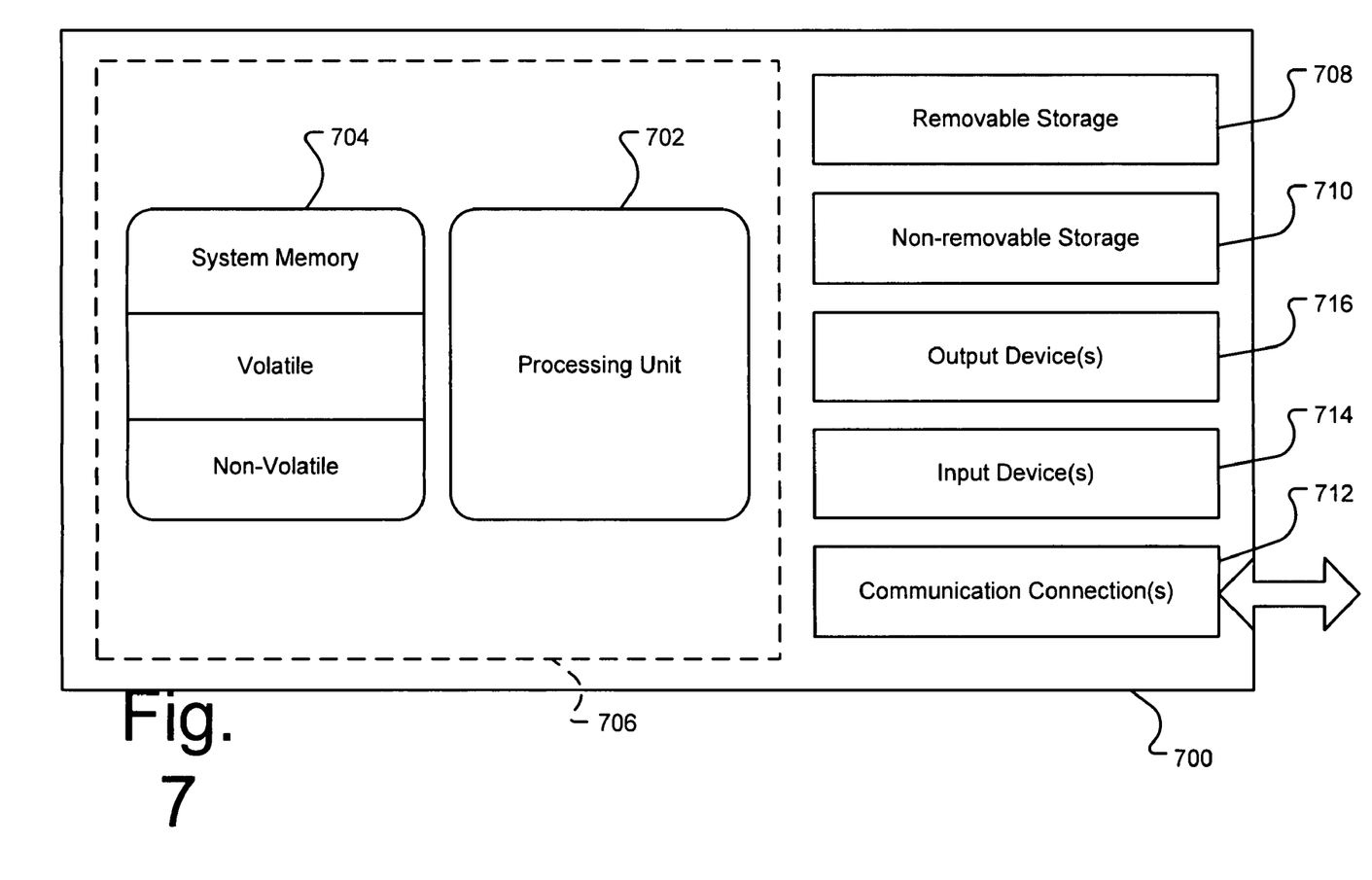
FIG. 7 is a schematic depiction of an exemplary computer system for accessing or publishing content over a network.

FIG. 7 illustrates an exemplary computer system 700 that may be used as either a user computer system incorporating products or a web server computer system providing content related to such products. In one implementation, the computer system 700 may be embodied by a desktop computer, laptop computer, file server computer, or web server computer, although other implementations, for example, video game consoles, set top boxes, portable gaming systems, personal digital assistants, and mobile phones may incorporate the described technology. The computer system 700 typically includes at least one processing unit 702 and memory 704. Depending upon the exact configuration and type of the computer system 700, the memory 704 may be volatile (e.g., RAM), non-volatile (e.g., ROM and flash memory), or some combination of both. The most basic configuration of the computer system 700 need include only the processing unit 702 and the memory 704 as indicated by the dashed line 706.

The computer system 700 may further include additional devices for memory storage or retrieval. These devices may be removable storage devices 708 or non-removable storage devices 710, for example, magnetic disk drives, magnetic tape drives, and optical drives for memory storage and retrieval on magnetic and optical media. Storage media may include volatile and nonvolatile media, both removable and non-removable, and may be provided in any of a number of configurations, for example, RAM, ROM, EEPROM, flash memory, CD-ROM, DVD, or other optical storage medium, magnetic cassettes, magnetic tape, magnetic disk, or other magnetic storage device, or any other memory technology or medium that can be used to store data and can be accessed by the processing unit 702. Information may be stored on the storage media using any method or technology for storage of data, for example, computer readable instructions, data structures, and program modules.

The computer system 700 may also have one or more communication interfaces 712 that allow the system 700 to communicate with other devices. The communication interface 712 may be connected with network as depicted in FIGS. 2, 3, and 5. The network may be a local area network (LAN), a wide area network (WAN), a telephony network, a cable network, an optical network, the Internet, a direct wired connection, a wireless network, e.g., radio frequency, infrared, microwave, or acoustic, or other networks enabling the transfer of data between devices. Data is generally transmitted to and from the communication interface 712 over the network via a modulated data signal, e.g., a carrier wave or other transport medium. A modulated data signal is an electromagnetic signal with characteristics that can be set or changed in such a manner as to encode data within the signal.

The computer system 700 may further have a variety of input devices 714 and output devices 716. Exemplary input devices 714 may include a keyboard, a mouse, a tablet, a touch screen device, a scanner, a visual input device, and a microphone or other sound input device. Exemplary output devices 716 may include a display monitor, a printer, and speakers. Such input devices 714 and output devices 716 may be integrated with the computer system 700 or they may be connected to the computer system 700 via wires or wirelessly, e.g., via a Bluetooth protocol. These integrated or peripheral input and output devices are generally well known and are not further discussed herein. In one implementation, program instructions implementing the methods or the modules for determining product and version information, creating version cookies, or searching content databases, are embodied in the memory 704 and storage devices 708 and 710 and executed by processing unit 702. Other functions, for example, handling network communication transactions, may be performed by an operating system in the nonvolatile memory 704 of the computer system 700.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention, In particular, it should be understand that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is is:

1. A computer-readable storage medium that does not consist of a signal, the computer-readable storage medium having computer-executable instructions stored thereon that, when executed, cause a computing device to perform a computer-implemented method for providing version-specific content, the the method comprising:
   receiving a search query from a user computer system for a particular product installed on the user computer system;
   searching a repository of general content related to a variety of products having multiple versions for product-specific content related to the particular product installed on the user computer system;
   accessing a persistent descriptor of a detected version of the particular product installed on the user computer system; and
   scoping a search result comprising a set of general content related to the particular product that is responsive to the search query and includes product-specific content related to multiple versions of the particular product by:
      filtering the product-specific content related to the multiple versions of the particular product included in the set of general content based on information in the persistent descriptor, and
      identifying a subset of version-specific content related to the particular product that is specific to the detected version of the particular product installed on the user computer system from the set of general content related to the particular product that is responsive to the search query.

2. The computer-readable storage medium of claim 1 further comprising computer-executable instructions for presenting the search result limited to the subset of version-specific content related to the particular product to the user computer system on which the detected version of the particular product is installed.

3. The computer-readable storage medium of claim 1 further comprising computer-executable instructions for requesting the persistent descriptor of the detected version of the particular product from the user computer system on which the particular product is installed.

4. The computer-readable storage medium of claim 3 further comprising computer-executable instructions for:
   transmitting a version detection module to the user computer system if the user computer system does not have the persistent descriptor;
   creating the persistent descriptor of the detected version of the particular product installed on the user computer system at the computing device based on version information received from the version detection module; and
   transmitting the persistent descriptor created at the computing device to the user computer system for storage on the user computer system.

5. The computer-readable storage medium of claim 4, wherein the persistent descriptor comprises a cookie file.

6. The computer-readable storage medium of claim 1 further comprising computer-executable instructions for:
identifying content related to the particular product that is nonspecific to the detected version of the particular product installed on the user computer system from the set of general content related to the particular product that is responsive to the search query;
presenting the search result limited to the subset of version-specific content related to the particular product to the user computer system; and
indicating to the user computer system that the content related to the particular product that is nonspecific to the detected version of the particular product installed on the user computer system is available for presentation.

7. The computer-readable storage medium of claim 1 further comprising computer-executable instructions for tagging subsets of version-specific content related to the particular product in the set of general content related to the particular product that is responsive to the search query to associate each subset of version-specific content with a different version of the particular product.

8. A computing device comprising:
the computer-readable storage medium of claim 1; and
a processing unit executing said computer-executable instructions stored thereon.

9. A computer-readable storage medium that does not consist of a signal, the computer-readable storage medium having computer-executable instructions stored thereon that, when executed, cause a computing device to perform a computer-implemented method for providing version-specific content, the method comprising:
receiving a search query from a user computer system for a particular software product installed on the user computer system;
accessing a persistent descriptor of a detected version of the particular software product installed on the user computer system; and
scoping a search result provided in response to the search query to the detected version of the particular software product installed on the user computer system by:
revising the search query received from the user computer system to include information in the persistent descriptor, and
searching a repository of general content related to a variety of software products having multiple versions for version-specific content related to the particular software product that is specific to the detected version of the particular product installed on the user computer system using the revised search query including the information in the persistent descriptor.

10. The computer-readable storage medium of claim 9 further comprising computer-executable instructions for presenting the search result limited to the version-specific content related to the particular software product to the user computer system.

11. The computer-readable storage medium of claim 9 further comprising computer-executable instructions for transmitting a software product version detection module to the user computer system.

12. The computer-readable storage medium of claim 9 further comprising computer-executable instructions for receiving the persistent descriptor from the user computer system.

13. The computer-readable storage medium of claim 11 further comprising computer-executable instructions for:
creating the persistent descriptor of the detected version of the software product installed on the user computer system at the computing device based on version information received from the software product version detection module; and
transmitting the persistent descriptor created at the computing device to the user computer system for storage on the user computer system.

14. The computer-readable storage medium of claim 13, wherein the persistent descriptor comprises a cookie file.

15. The computer-readable storage medium of claim 10 further comprising computer-executable instructions for providing access to an additional unscoped search result from the repository of general content that includes product-specific content related to multiple versions of the particular software product.

16. A computing device comprising:
the computer-readable storage medium of claim 9; and
a processing unit executing said computer-executable instructions stored thereon.

17. A computer system for providing version-specific content to a remote user computer system, the computer system having a processing unit for executing computer-executable modules stored in memory and comprising:
a data repository of general content related to a variety of products having multiple versions;
a detection module to interrogate the remote user computer system to identify a particular product installed on the remote user computer system and a version of the particular product; and
a search module to receive a search query for the particular product from the remote user computer system, revise the search query for the particular product to include version information identified by the detection module, search the general content of the data repository for version-specific content related to the particular product that is specific to the version of the particular product installed on the remote user computer system using the revised search query including the version information identified by the detection module, and return a result of the search limited to the version-specific content related to the particular product to the remote user computer system in response to the search query for the particular product.

18. The computer system of claim 17, wherein the product is a productivity software program installed on the remote user computer system.

19. The computer system of claim 17 further comprising a descriptor creation module to create a persistent descriptor based on product and version information identified by the detection module.

20. The computer system of claim 19, wherein the persistent descriptor is a cookie file.

* * * * *

UNITED STATES PATENT AND TRADEMARK OFFICE
CERTIFICATE OF CORRECTION

| | | |
|---|---|---|
| PATENT NO. | : 7,991,891 B2 | Page 1 of 1 |
| APPLICATION NO. | : 11/346094 | |
| DATED | : August 2, 2011 | |
| INVENTOR(S) | : Michael J. Kelly et al. | |

It is certified that error appears in the above-identified patent and that said Letters Patent is hereby corrected as shown below:

In column 12, line 20, in Claim 1, delete "the the" and insert -- the --, therefor.

Signed and Sealed this
Fourth Day of October, 2011

David J. Kappos
*Director of the United States Patent and Trademark Office*